Sept. 21, 1937.　　　　L. K. SWART　　　　2,093,854
MEASURING DEVICE
Filed Dec. 12, 1936
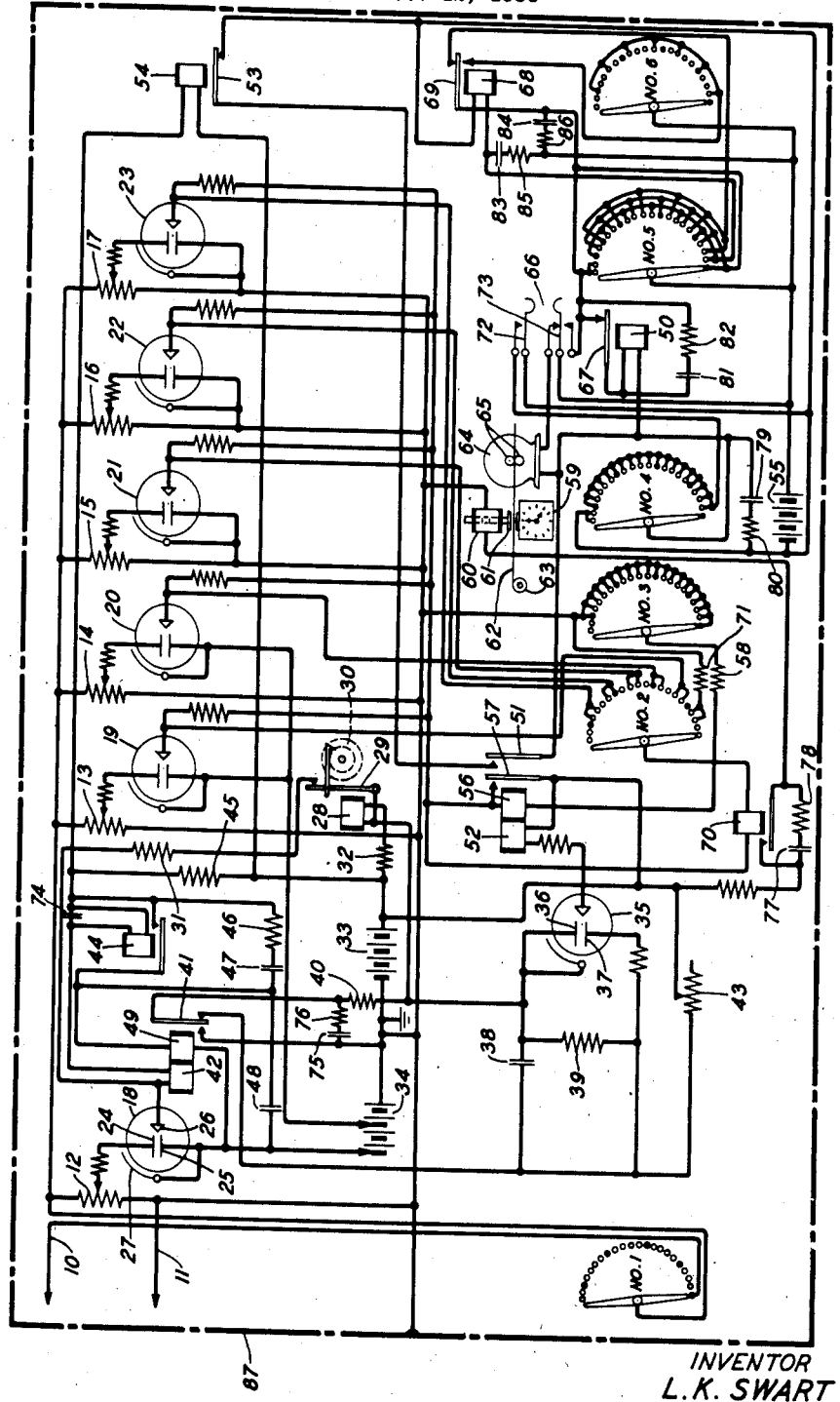
INVENTOR
L. K. SWART
BY
G. M. Campbell
ATTORNEY Patented Sept. 21, 1937

2,093,854

UNITED STATES PATENT OFFICE 2,093,854

MEASURING DEVICE

Leland K. Swart, Mountain Lakes, N. J., assignor to Bell Telephone Laboratories, Incorporated, New York, N. Y., a corporation of New York Application December 12, 1936, Serial No. 115,561

15 Claims. (Cl. 234—1.5)

This is a continuation in part of my application Serial No. 109,717, filed November 7, 1936.

This invention relates to measuring instruments, and particularly to instruments for measuring and recording peak voltages.

The object of this invention is a peak voltage recorder which is entirely automatic in its operation.

A feature of this invention is a means for recording the approximate value of a voltage as a series of time stamps, the number of stamps being indicative of the peak value and the time of occurrence being given directly by the stamp itself.

In its preferred form this invention comprises a series of gas-filled discharge tubes, each adjusted to discharge at a different potential, connected across the input to the measuring device. The first tube operates a control stage which determines when the automatic measuring apparatus shall be set into operation. Cooperating with the control stage is a timing stage employing a gas-filled discharge tube which segregates short impulses from impulses of a predetermined duration and prevents the operation of the measuring apparatus except upon the appearance of a pulse of the proper duration. Immediately after a pulse disappears its measurement is effected by means of a rotary switching selector which connects each of the measuring tubes to a time stamp, those tubes which are discharged being conducting and thereby operating the stamp, while those not discharged are not conducting and do not affect the stamp. The selector likewise disconnects the measuring device from the line while a measurement is being made, to prevent its premature operation by succeeding impulses, and also restores the device to its original condition.

For a more detailed description of the features and operation of the measuring device, reference is made to the accompanying schematic circuit diagram which forms a part of this specification.

In the drawing, the input leads to the measuring device are shown at 10 and 11. Across leads 10 and 11 are connected a number of voltage dividers 12, 13, 14, 15, 16 and 17. Associated with each voltage divider is a discharge tube 18, 19, 20, 21, 22 and 23, respectively, preferably of the cold cathode type. Each tube is provided with a control electrode 24, a cathode 25, an anode 26 and a shield 27, the shield being connected in each case to the cathode.

According to the well-known theory, the gas within a discharge tube does not become conducting unless a predetermined potential is impressed across its control electrode and cathode. When it does become conducting, however, current flows from the cathode to the anode and continues to flow, regardless of the potential of the control electrode, until the potential between the anode and cathode is removed. Each voltage divider is adjusted so that the proportion of impressed voltage connected across the control electrode and cathode is progressively smaller. Thus an incoming impulse may be sufficiently large to operate some, but not all, of the tubes. By calibrating each tube it is possible to determine the approximate value of a voltage impulse from the number of tubes operated. The number of tubes used depends upon the degree of accuracy with which a measurement is to be made.

Examining now the control stage, means are provided therein for (1) operating an impulse register to record the appearance of all surges capable of discharging tube 18 regardless of the duration of such surges, (2) initiating the operation of the timing stage, (3) resetting tube 18 immediately after a surge disappears, and (4) initiating the measuring operation.

The impulse register comprises a solenoid 28, the armature 29 of which operates a counting device 30. When tube 18 discharges, current flows from anode 26 through resistance 31, armature 29 and its associated contact to solenoid 28 and from there through a second resistance 32, a 130-volt battery 33, a second battery 34 to cathode 25. This circuit is established each time tube 18 becomes conducting and hence counting device 30 records the number of times a voltage sufficient to discharge tube 18 appears across input leads 10, 11.

The timing stage comprises a gas-filled discharge tube 35, preferably of the cold-cathode type the potential across the cathode 36 and control electrode 37 of which is derived from battery 33 through a timing network. The timing network comprises a condenser 38, shunted by a resistance 39, which is connected across cathode 36 and control electrode 37 of discharge tube 35. One side of condenser 38 is connected through resistance 40, armature 41 and normally open front contact of work relay 42 to the negative side of battery 33, and the other side of condenser 38 is connected through an adjustable charging resistance 43 to the positive side of battery 33. Thus when tube 18 of the control stage becomes conducting, a circuit is established from its anode 26, through one winding of work relay 42, through a vibrating relay 44, resistance 45 and batteries 33 and 34 to cathode 25, and work relay 42, therefore, pulls up its armature 41 and connects battery 33 across the timing network. Condenser 38 commences to charge at a rate determined by its capacity, the impressed potential and the value of resistance 43, and continues to charge as long as work relay 42 remains operated. At the same time, vibrating relay 44 pulls up its armature and completes a circuit from battery 33, through the contacts of vibrating relay 44, winding 49 of work relay 42 and cathode 25 of tube 18. This circuit reduces the voltage between the anode and cathode of tube 18, thereby rendering the tube non-conducting and deenergizing the winding of relay 42 and vibrating relay 44. Vibrating relay 44, therefore, falls off and condenser 47 commences to charge through resistance 46 until the voltage between anode 26 and cathode 25 of tube 18 rises again to the full voltage of battery 33 and battery 34. If potential is still present between control electrode 24 and cathode 25, the tube again becomes conducting and the process is repeated. Vibrating relay 44 vibrates at a rate depending upon the capacity of condenser 74 and condenser 47, whereas the work relay 42 remains operated continuously by virtue of current flowing alternately in each of its windings. At the moment the voltage disappears between control electrode 24 and cathode 25 of tube 18, and vibrating relay 44 subsequently falls off, tube 18 will remain non-conducting and work relay 42 will release. The armature of relay 42 will, therefore, be pulled up as long as an impulse is present and hence condenser 38 will continue to charge. If the impulse lasts sufficiently long to enable condenser 38 to acquire a potential equal to or greater than the potential required to ionize the gas in tube 35, the tube will discharge and complete a circuit through its anode.

The measuring operation does not begin until after the surge disappears. Since the measurement is accomplished by means of a rotary selector switch, the circuit to the switch is so designed that the switch is inoperative until the surge disappears. The relay for operating the switch is shown at 50. The circuit to one side of relay 50 can be traced through armature 51 of relay 52, armature 53 of relay 54 to the negative side of battery 55. For this circuit to be completed, however, relay 52 must be energized and relay 54 deenergized. Relay 52 is energized by the ionization of tube 35 in the timing circuit and relay 54 is energized by the ionization of tube 18 in the control circuit. Since tube 18 is discharged only when a surge is present, relay 54 will likewise be energized only for the duration of a surge and hence selector switch relay 50 will not be energized as long as a surge is present. Timing tube 35 is not reset upon the disappearance of a surge as is control tube 18, but remains ionized by virtue of the fact that a second winding 56 on relay 52 is connected across battery 33 and is locked in by a second armature 57 which is pulled up by relay 52. The circuit through second winding 56 is completed from the positive side of battery 33 through armature 57, winding 56, current limiting resistance 58 and No. 3 bank of the rotary selector to the negative side of battery 33. The contacts of the No. 3 bank are connected together so that relay 52 remains pulled up until the measuring process is completed.

The actual indication of the value of the voltage surge consists of a group of time stamps, the number of stamps in a group being a measure of the voltage. Each time stamp represents the ionization of the control tube 18 and one of measuring tubes 19, 20, 21, 22 and 23. The stamp may comprise a clock-driven printing device 59 and a solenoid 60, the plunger 61 of which is separated from printing device 59 by a paper tape 62 upon which the characters of printing device 59 are adapted to be impressed. Paper tape 62 is unwound from a supply reel 63 by a motor 64 through a pair of pressure rollers 65. Each time relay 60 is energized, plunger 61 makes an impression of the time indicated by clock 59 upon tape 62. If desired, the printing device and associated apparatus may be located some distance away from the remainder of the measuring device, as for example, in a central office.

In general, solenoid 60 is energized by successively connecting each measuring tube thereto through the No. 2 bank of the rotary selector. Before and during the appearance of a voltage surge all arms of the selector are on the first contact of the corresponding bank of contacts. In this position the input to the measuring device is unbroken and the operation of the control, timing and measuring tubes can be effected by an incoming surge. Upon the disappearance of the surge, control tube 18 is reset and a circuit as completed from the positive side of battery 55, through the No. 5 bank of the selector switch, back contact and armature 67 of selector relay 50, the winding of relay 50, armature 51 of timing relay 52, armature 53 of relay 54 to the negative side of battery 55. Selector relay 50 will, therefore, energize and advance all switch arms to the second contact of the corresponding banks. The energization of selector relay 50, however, breaks the circuit through itself and hence stops the movement of the switch. At the second contact the circuit to the input is broken through the operation of the No. 1 bank, so that throughout the remainder of the operation of the selector, the measuring tubes are inaccessible to incoming surges.

Starting with the positive side of battery 55 and with all arms on the second contacts a circuit is completed through the No. 5 arm, through the winding of relay 68, back to the negative side of battery 55 thereby energizing relay 68. Simultaneously with the completion of this circuit another circuit is established from the positive side of battery 55, through the No. 6 bank, armature 69 of relay 68, armature 67 of selector relay 50 (armature 67 having fallen back upon the deenergization of this relay) selector relay 50, armature 51 of relay 52 and armature 53 of relay 54, back to the negative side of battery 55. With the establishment of the circuit through selector relay 50, the selector switch is again operated and the various arms moved to their respective third contacts. The movement to the third contact, however, breaks the circuit through the No. 6 bank and front contact of relay 68, but since the No. 5 bank likewise breaks the circuit through relay 68 and establishes a circuit through the back contact of relay 68 to the selector magnet, the latter is again energized and the arms moved to the fourth contact. At the fourth contact the Nos. 5 and 6 banks are in exactly the same condition as they were at the first contact and hence the cycle of operations is continued until the arms have been moved to the twenty-first contact. Banks Nos. 5 and 6 and relays 50 and 68 thus constitute a driving means for the rotary selector switch which is automatic, and since relay 68 can be chosen to operate and release at various speeds, the speed of rotation of the selector switch can be made to suit the speed of operation of the time stamping means.

It will be remembered that upon the appearance of a surge of predetermined duration, anode potential is connected to the measuring tubes 19, 20, 21, 22 and 23 through the energization of relay 52 and that this relay is locked in by its secondary winding 56. Such tubes as are ionized by the surge, therefore, remain ionized as long as relay 52 is locked in. The anode of each measuring tube is connected to a pair of contacts on the No. 2 bank, the first being connected to the sixth and seventh contacts, the second to the ninth and tenth contacts, the third to the twelfth and thirteenth contacts, etc. In the device illustrated, the last tube is connected to the eighteenth and nineteenth contacts so that with a twenty-two contact bank the last three are open.

Since the control stage operates at a predetermined minimum voltage, it constitutes the first measuring stage. The anode-cathode circuit of tube 18, however, is not available to operate the time stamp but since the selector switch cannot operate unless tube 18 was previously discharged, the operation of the switch is used to indicate the operation of tube 18. The first available contacts, i. e., the third and fourth contacts on the No. 2 bank, are used to operate the time stamp for this purpose. The circuit is traceable from the positive side of battery 33 through armature 57 of timing relay 52, relay 70, the arm and third and fourth contacts of the No. 2 bank and current limiting resistance 71 to the negative side of battery 33. Relay 70, when energized, connects the positive terminal of battery 33 to one side of time stamp solenoid 60, the opposite side of which is connected to the negative side of battery 33. Relay 70 acts as a control relay for solenoid 60, and if required, may be used to connect a separate source of current to solenoid 60 if battery 33 is found to be inadequate. The operation of solenoid 60, of course, causes the time to be stamped upon tape 62.

Since each time stamp should be separately recorded, tape 62 must be moved after each operation of plunger 61. This is made possible by causing motor 64 to begin operating as soon as armature 53 of relay 54 falls back. The circuit runs from the positive side of battery 55 through switch 66, motor 64, armature 51 of timing relay 52, and armature 53 of relay 54 back to the negative side of battery 55. Motor 64, therefore, begins to operate before the arm of No. 2 bank reaches its second contact and insures the removal of the portion of tape 62 previously positioned under plunger 61. Since motor 64 operates continuously, tape 62 is moved after each operation of the time stamp so that when the arm of the No. 2 bank reaches the sixth contact of the bank, that is, the contact corresponding to the next increment of voltage, a fresh portion of tape 62 is presented to plunger 61. Upon reaching the sixth contact, a circuit is established through the anode of measuring tube 19, and if this tube is ionized, current will flow through its cathode to a tap on battery 34 which is in series with battery 33, the positive side of which, as previously described, is already connected through relay 70 to the No. 2 arm. Relay 70 will, therefore, be energized and a time stamp will be made on tape 62. As the No. 2 arm continues to move the anodes of each of the measuring tubes will be connected into the circuit and will or will not cause a time stamp to be made, depending upon whether or not the corresponding tube is ionized.

When the arms reach the twentieth contact in each bank, the circuit through the holding winding 56 of relay 52 will be broken by the No. 3 bank and this relay will, therefore, deenergize, thereby breaking the circuit through selector relay 50 and resetting measuring tubes 19, 20, 21, 22 and 23 by removing anode potential therefrom. It is desirable, however, that the selector come to rest upon the first contact so that the measuring device will again be in condition to measure succeeding voltages. For this purpose the twenty-first contact of the No. 4 bank, and the remainder of the contacts following the twenty-first are connected directly to the negative side of battery 55, thereby replacing the circuit through relay 52, and the arm of the No. 4 bank is directly connected to one side selector relay 50. The other side of selector relay 50 is connected to the contacts on the No. 5 bank which remain after the twentieth, and through the No. 5 arm directly to the positive side of battery 55. The delay feature introduced by relay 68 is no longer necessary after all of the measuring tubes have been connected into the time-stamping circuit, and hence the selector relay is not connected to the No. 5 arm through relay 68 in the manner adopted for contacts one to twenty.

When all of the arms are again on the first contacts of their respective banks, the circuit through input lead 10 is again completed by the No. 1 bank, motor 64 is stopped and the remainder of the apparatus is ready for another surge.

In some cases it may be desirable to dispense with the recording device for a time and have an attendant observe the operation of the measuring tubes and impulse register. This can be done by means of switch 66. Battery 55 is connected across prongs 72 and 73 which, when separated, connect the negative side of battery 55 to the second to the twentieth contacts of bank No. 4 and the positive side directly to the back contact of selector magnet 50. The first contact on the No. 4 bank is omitted since the negative side of battery 55 is initially connected to selector magnet 50 through relays 52 and 54. After the selector moves to its second position, negative battery is supplied to selector magnet 50 directly through contacts two to twenty of bank No. 4. The separation of the prongs removes positive battery from motor 64 to render the tape 62 immobile throughout the operation of the measuring tubes and rotary selector, and banks Nos. 5 and 6 are short-circuited since the delay feature produced by relay 68 and controlled by these banks is no longer necessary. All apparatus is automatically restored to its orginal condition as before.

Certain refinements are shown in the circuit illustrated which tend to improve the general operation of the device. In the control stage, vibrating relay 44 is shunted by a condenser 74 which regulates the time required for the relay to operate. Throughout the device series condenser and resistance combinations have been used to prevent arcing between certain contacts. For example, condenser 75 and resistance 76 prevent arcing between armature 41 of work relay 42 and its contacts, condenser 77 and resistance 78 prevent arcing at the time stamp relay 70, condenser 79 and resistance 80 prevent arcing between the arm and contacts of the No. 4 bank, condenser 81 and resistance 82 prevent arcing at the selector magnet 50 and condensers 83 and 84 and resistances 85 and 86 prevent arcing at delay relay 68. The precautions against arcing are taken not only to protect the contacts involved, but to avoid a false operation of the time stamp. A metal cover 87, which is grounded, acts as a shield against stray voltages which likewise might cause a false operation of the time stamp. Tubes 19, 20, 21, 22, 23 and 35 are provided with current limiting resistances in the control electrode and anode circuits to prevent undue heating of the tubes.

The operation of the device requires little or no attention. Terminals 10 and 11 are connected across the external line, preferably through resistances (not shown) and the tape 62 and impulse register 30 are observed from time to time to note the number and peak value of the surges actuating the device. An incoming surge will first operate control tube 18 and impulse register 30. Since positive potential is connected to anode 26 through impulse register relay 28 independently of vibrating relay, the register will operate regardless of the duration of the surge. Relay 42 immediately connects timing condenser 38 across battery 33 and if the surge lasts sufficiently long, timing tube 35 will ionize and energize relay 52, thereby putting anode potential on the measuring tubes 19, 20, 21, 22 and 23. At the same time relay 54 will pull up and prevent the selector from operating as long as the surge is present. With anode potential on all of the measuring tubes and the fraction of the incoming surge as determined by voltage dividers 13, 14, 15, 16 and 17 impressed across the control electrode and cathode of each tube, some or all will ionize, depending upon the value of the surge. Assuming for purposes of illustration that the first four tubes have ionized, these tubes will remain in ionized condition until the measuring process is completed, despite the fact that the surge may have disappeared.

Upon the disappearance of the surge, vibrating relay 44 resets control tube 18 and work relay 42 falls back and discharges timing condenser 38 through resistance 40. Timing tube 35 is reset by virtue of the fact that the circuit from the negative side of battery 33 to cathode 36 is opened by the contacts of relay 42. Relay 54 is likewise released and the falling back of its armature 53, together with the locking in of relay 52 starts the operation of rotary selector 50 and time stamp motor 64. The No. 1 bank of the selector disconnects the device from the line, the No. 2 bank controls the time stamp, the No. 3 bank locks in relay 52 and thereby maintains the ionization of the first three tubes, the No. 4 bank returns the selector to its starting position on the first contact, and the Nos. 5 and 6 banks control the movement of the selector.

After the selector has returned to its starting position, a record of four stamps will be found on tape 62. The number of stamps in a group indicates the value of a surge. Assuming that the first measuring tube (control tube) was set to discharge upon the appearance of a voltage surge greater than 10 volts, the second a voltage surge greater than 20 volts, the third 30 volts, the fourth 40 volts, the fifth 50 volts, and the sixth 60 volts, the four stamps indicate that the value of the surge which just actuated the device lay between 40 and 50 volts. The reading on impulse register 30 indicates, by comparison with the number of groups of time stamps, whether surges of any value great enough to operate control tube 18, but of insufficient duration to operate timing tube 35, were also present in the line.

It is understood that the foregoing description is merely illustrative of the invention and that the invention is not to be limited thereto, but is to be determined by the appended claims.

What is claimed is:

1. In a device for measuring the peak value of an applied voltage, a control circuit for the device, a plurality of gas-filled discharge tubes, individual voltage dividers across the input to the discharge tubes, each voltage divider being adjusted to impress a different proportion of the applied voltage across its associated tube, whereby the number of tubes ionized by an applied voltage is a measure of the peak value of said voltage, and a timing circuit operated by the control circuit and adapted to prevent the ionization of said tubes except upon the application of a voltage thereto which persists for a predetermined length of time.

2. In a device for measuring the peak value of an applied voltage, a control circuit, gas-filled discharge tubes, voltage dividers and timing circuit all as in claim 1, said timing circuit comprising an additional gas-filled discharge tube adapted to connect ionizing potential to certain of said first-mentioned discharge tubes, a battery, a condenser, and a resistance in series, said condenser being connected across the input to said timing circuit tube, and means operable by said control circuit for connecting the battery across the condenser and resistance, whereby the operation of the control stage causes the condenser to charge at a predetermined rate and acquire a charge sufficient to operate the timing circuit tube at a predetermined time after the appearance of a voltage surge at the input to the device.

3. In a device of the type described, a control circuit for initiating the operation of the device, a timing circuit controlled by said control circuit and adapted to prevent the operation of the device except upon the appearance of a voltage surge which persists for a predetermined length of time, and a counting device independent of the timing circuit and adapted to register the presence of each surge capable of operating the control circuit irrespective of its duration.

4. In a voltage measuring device of the type described, an input circuit, a plurality of voltage dividers connected across said input circuit, each divider being adjusted to a different proportion of an applied voltage, a plurality of gas-filled discharge tubes the control electrode and cathode of each being connected to a voltage divider, a source of potential for the anodes of said tubes, means for preventing the application of the potential to the anodes of certain of the tubes except upon the appearance of a voltage of predetermined duration at the input circuit, a time stamp, and means for successively connecting said time stamp to said tubes whereby the ionization of any of said tubes is recorded as a time stamp.

5. In a voltage measuring device of the type described, an input circuit, a plurality of voltage dividers across said input circuit, a plurality of gas-filled discharge tubes connected across the output of said voltage dividers, the voltage dividers being adjusted to impress progressively decreasing proportions of an applied voltage across said tubes whereby the number of tubes ionized by the applied voltage is a measure of the peak value of said voltage, a recording device, and a rotary selector switch adapted successively to connect said tubes to said time stamp to cause the time stamp to record the fact of ionization of said tubes and thereby record the value of the applied voltage.

6. In a voltage measuring device of the type described, an input circuit, a plurality of voltage dividers across said input circuit, a plurality of gas-filled discharge tubes connected across the output of said voltage dividers, each divider being adjusted to impress a different proportion of an applied voltage across its corresponding tube, a recording means operable by an ionized tube, a rotary selector switch adapted successively to connect each tube to said recorder, and a control circuit for preventing the operation of said selector except upon the appearance of a voltage surge of predetermined duration across the input to the device.

7. In a voltage measuring device of the type described, an input circuit, a control circuit comprising in combination a gas-filled discharge tube adapted to be ionized upon the application of a voltage surge to its input electrodes and a work relay which is energized by the ionization of said tube, additional gas-filled discharge tubes, voltage dividers connected across the input circuit, the output of said dividers being connected across the input of all of the gas-filled tubes and adjusted so that the number of tubes which are ionized by an applied voltage is proportional to the peak value of the applied voltage, and a time stamp, controlled by said work relay and adapted to record the ionization of any of said discharge tubes, whereby a permanent record of the peak value and time of occurrence of an applied voltage may be obtained.

8. In a voltage measuring device of the type described, an input circuit comprising in combination a gas-filled discharge tube adapted to be ionized upon the application of a voltage surge to its input electrodes, a work relay which is energized by the ionization of said tube, a vibrating relay for resetting the tube, and a message register in parallel with the work and vibrating relays, the circuit through the register being broken upon the operation of said register whereby the tube is not reset until the register has operated to indicate the appearance of voltage pulses persisting for a shorter time than the time required to operate the message register, additional gas-filled discharge tubes connected across the input circuit, and individual voltage dividers at the input to each additional tube, each divider being set to impress a predetermined proportion of a voltage pulse across its associated tube and thereby cause the number of tubes ionized by the voltage pulse to be a measure of the peak value of said voltage.

9. In a voltage measuring device of the type described, a control circuit for initiating the operation of the device, a plurality of gas-filled discharge tubes connected in parallel across the input to the device, a voltage divider at each tube for limiting the proportion of a voltage pulse impressed across each tube, each voltage divider being set to a different proportion, an additional gas-filled discharge tube, a condenser across the input to said additional tube, a resistance, a source of potential, and means controlled by said control circuit for charging said condenser from the source of potential through the resistance to provide a delay for the operation of the additional tube, a relay adapted to be energized by the ionization of the additional tube, a recording means, a multiple bank rotary selector switch, contacts on said relay for connecting anode potential to the first-mentioned gas-filled tubes and for completing the circuit through said selector switch, a bank on said selector switch for successively connecting said first-mentioned tubes to the recorder, a second bank on said selector for removing the device from the line after a voltage surge has disappeared and while it is being measured and a third bank on said selector for restoring the selector to normal after a measurement is made.

10. In a voltage measuring device of the type described, a control circuit, a plurality of gas-filled discharge tubes connected in parallel across the input to the device, a voltage divider at each tube for limiting the proportion of a voltage pulse impressed across the tubes, each voltage divider being set to a different proportion, an electrically driven time stamp and a rotary selector switch having a plurality of banks of contacts, one bank being adapted to connect each tube to the time stamp, another bank being adapted to disconnect the input to said tubes after a voltage surge has disappeared and during the operation of said selector, a third bank being adapted to restore the selector switch to its original position, a fourth bank being adapted to reset the discharge tubes, and relay means controlled by said control circuit for initiating the operation of the selector switch.

11. In a voltage measuring device of the type described, an input circuit, a plurality of voltage dividers connected across said input circuit and set to transmit therethrough different proportions of an applied voltage, a plurality of gas-filled discharge tubes connected to the outputs of said voltage dividers so that the number of tubes ionized is a measure of the voltage across the input circuit, a relay-operated counting device adapted to be operated by all surges appearing at the input circuit, an electrically driven time stamping device, and a rotary selector switch for connecting each tube to the time stamp whereby the magnitude and time of occurrence of each voltage pulse operating the tubes are recorded.

12. In a voltage measuring device of the type described, a plurality of voltage dividers in parallel across the input to the device, each divider being adjusted to transmit therethrough a different proportion of a voltage impressed across the input, a plurality of gas-filled discharge tubes the control electrode and cathode of each being connected to the output of a voltage divider, a source of potential, a delay circuit for preventing the application of the potential to the anodes of certain of the tubes except upon the appearance of a voltage surge of a predetermined duration, said delay circuit comprising a gas-filled discharge tube, a condenser connected across the input to the tube, a resistance and a source of potential which is adapted to charge the condenser through the resistance, an electrically operated time stamp, a rotary selector switch having a plurality of banks of contacts, one bank being adapted to connect the anode of each of said first-mentioned tubes to the time stamp to obtain a record of the time of appearance of a voltage surge and its maximum value, a second bank being adapted to disconnect the input to the device while a measurement is being made and a third bank being adapted to restore the selector switch to its original position, and a control circuit for initiating the operation of the delay circuit upon the appearance of a voltage surge and for initiating the operation of the rotary selector switch upon the disappearance of said surge.

13. A voltage measuring device according to claim 12, said control circuit comprising in series one of said gas-filled discharge tubes, a work relay, a vibrating relay and a source of anode potential, and an electromagnetically operated counting device in shunt to the work relay and vibrating relay and adapted to break the circuit through itself when operated whereby the presence of a voltage surge of any duration sufficient to operate the control circuit is indicated irrespective of the time required to operate the counting device.

14. A voltage measuring device according to claim 12 and means associated with said rotary selector switch for reducing the speed of the switch to correspond to the speed of the time stamp.

15. A voltage measuring device according to claim 12, said control circuit comprising in combination one of said gas-filled discharge tubes, a work relay, a vibrating relay to reset the tube and a source of potential, all in series, and an electromagnetically operated counting device in shunt to the work relay and vibrating relay and adapted to break the circuit through itself when operated, whereby the presence of a voltage surge of any duration sufficient to operate the control circuit is indicated irrespective of the time required to operate the counting device, and means associated with said rotary selector switch for reducing the speed of the switch to correspond to the speed of the time stamp.

LELAND K. SWART.